April 21, 1936.    J. H. VAN UUM ET AL    2,037,838
METHOD OF MAKING SPLIT TAPERED FORMED COLLARS
Filed May 14, 1935    2 Sheets-Sheet 1

INVENTORS
JOHN H. VAN UUM,
STEVEN RONYAK
& JOHN HOFFMAN
BY Justin W. Macklin
ATTORNEY.

April 21, 1936. J. H. VAN UUM ET AL 2,037,838
METHOD OF MAKING SPLIT TAPERED FORMED COLLARS
Filed May 14, 1935 2 Sheets-Sheet 2
Fig. 9
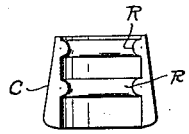  
Fig. 10 Fig. 11 Fig. 12
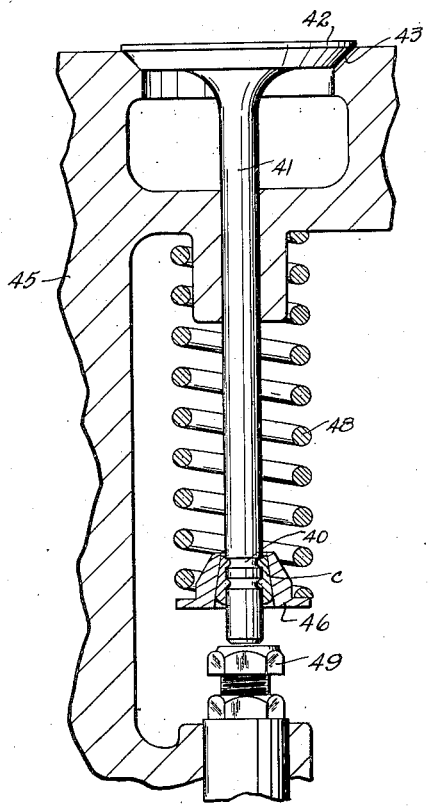
Fig. 13
INVENTORS
JOHN H. VAN UUM,
STEVEN RONYAK
& JOHN HOFFMAN
By Justin W. Macklin
Attorney Patented Apr. 21, 1936

2,037,838

UNITED STATES PATENT OFFICE 2,037,838

METHOD OF MAKING SPLIT TAPERED FORMED COLLARS

John H. Van Uum, Lakewood, Steven Ronyak, Cleveland, and John Hoffman, Painesville, Ohio, assignors to John H. Van Uum, Lakewood, Ohio Application May 14, 1935, Serial No. 21,416

4 Claims. (Cl. 29—148)

This invention relates to the forming of split collars and is particularly adapted to the forming and coining of split rings or collars having shoulders or ribs, tapers, and the like. Its essential objects are to manufacture, by a series of steps repeated at high rates of speed, partially circular or round members forming segments, a plurality of which when put together, as for example a pair, form an easily assembled and easily removable collar of accurate dimensions. Further objects include accomplishing this with precision and at comparatively low cost.

More specifically, the invention pertains to the formation of half collar members having a tapered exterior and one or more ribs on the interior such as are used for locking the valve spring retaining collar to the stem of an automobile valve. A further object is to make such parts from continuous strips of uniform section of cold-rolled steel or metal having similar characteristics by bending and cutting operations repeated in a given order and in rapid succession.

The above and other objects will become more apparent in the following description which relates to the drawings illustrating dies and tools for carrying out my apparatus, showing a product which may be formed by my process.

In the drawings Figs. 1, 2, 3, and 4 are sectional plans showing a forming tool in suitable guide in four successive forming positions.

Fig. 9 shows a portion of a blank strip.

Fig. 10 is an elevation on a slightly enlarged scale of one of the split collar members.

Fig. 11 is a plan of the same.

Fig. 12 shows a modification in the view corresponding to Fig. 10.

Fig. 13 illustrates the use of such a split collar in an automobile motor valve assembly.

Figure 1:
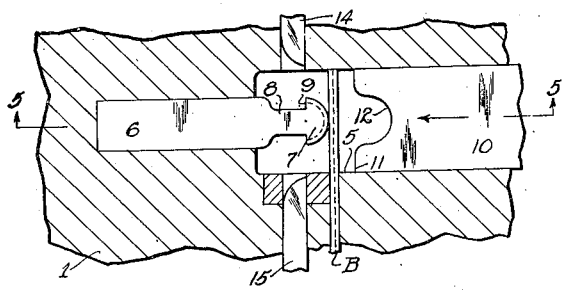

Referring to the parts shown, which are illustrative of forming tools and cutting members which may be used to carry out my invention, and which are subjected to variation without departing from the spirit of the present invention,—

1 indicates the bed plate of a holding member of a suitable forming machine and in which the forming and cutting members are mounted.

B indicates the work blank or strip shown in Fig. 9 which is fed thru a guide opening in the plate 1 to the fore wall of a recess 5 into which projects a male forming tool 6 having a head member 7 substantially half circular or half-cylindrical, with a reduced neck portion 8.

Figure 2:
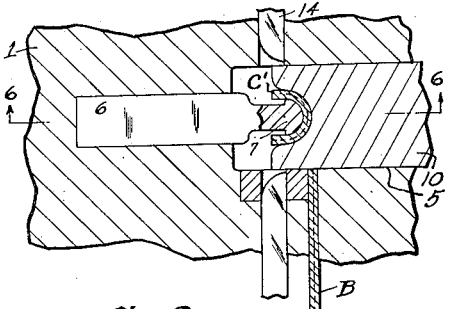

10 indicates forming and cutting tool which when moved inwardly severs at its edge 11 the inwardly projecting portion of the blank B while its recess 12 complementary to the segment of the member 7 is adapted to form the severed portion of the blank into the shape shown at C' in Fig. 2.

Figure 5:
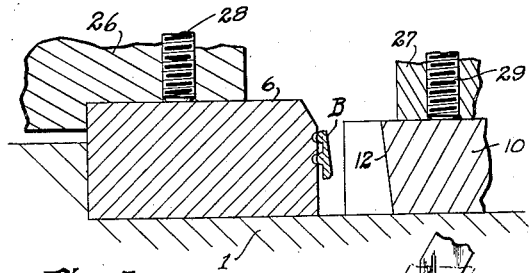
Fig. 5 is a vertical sectional view thru the parts taken on a plane indicated by the line 5—5 of Fig. 1.
Figure 6:
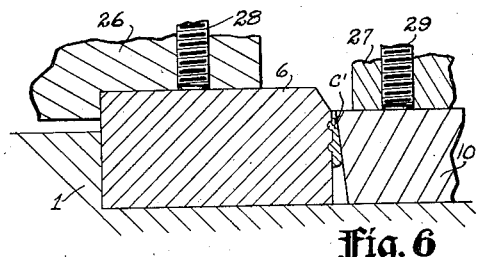
Fig. 6 is a similar vertical sectional view taken on the plane indicated by the line 6—6 of Fig. 2.

The surface of the recess 12 is flared to compensate for the taper which is provided in the original strip, the one side being thicker than the other as appears particularly in Figs. 10 and 12. The slope of the recess 12 is also apparent in Figs. 5 and 6.

Figure 3:
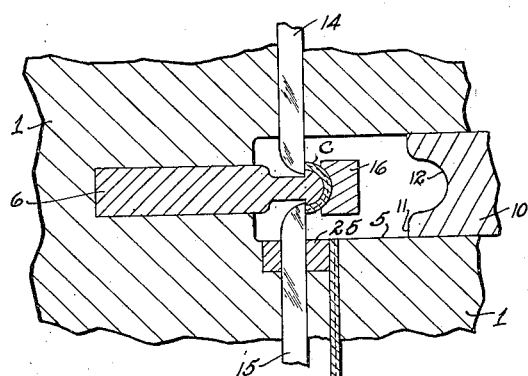
Figure 4:
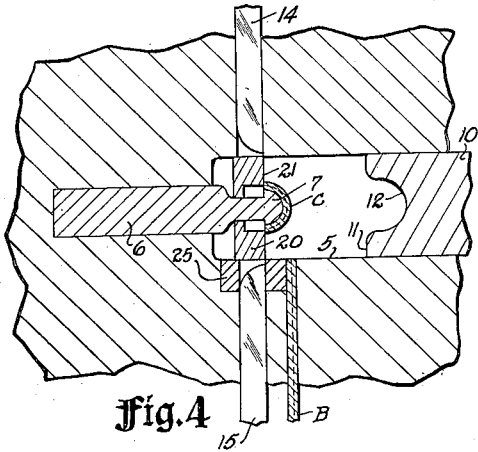

The depth of the recess 12 is somewhat greater than the depth of the finished half circle and the length of the cutoff blank namely the width of the recess 5, is such as to leave overhanging ends on the member C extending inwardly over the reduced neck portion 8, which terminate at abrupt shoulders 9, allowing for the action of cutting knives 14 and 15 which are now brought into action trimming the surplus and squeezing blank C more tightly about the head 7, as indicated at C in Fig. 3. Simultaneously with this cutting the blank is pressed tightly against the head 7 by a coining holding member in the nature of a member 16, which is moved downwardly to engage and partially fit around the exposed convex surface of the blank during the cutting operation. As this bar moves downwardly on offset 17 the other cam surface means, for example, which engages a guide indicated at 18, causes this member to be pressed firmly inwardly in the position shown in broken lines in Fig. 7.

Figure 7:
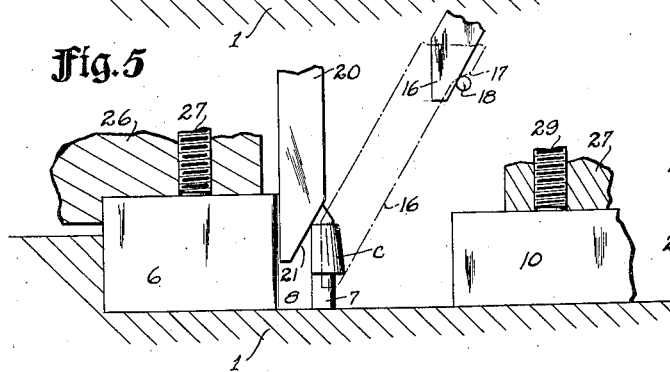
Fig. 7 is a sectional view showing the forming dies separated or withdrawn and the stripping or ejecting tool in operating position.
Figure 8:
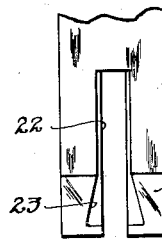
Fig. 8 is an elevation of a stripping or ejecting tool.

Immediately thereafter a stripper tool 20 having cam surfaces indicated at 21 and having a recess 22 adapted to pass over the neck 8 of the forming tool with enlargements 23 to clear the head portion thereof, wedges the finished collar member C, the bar 16 having receded toward the position shown in solid lines in Fig. 7. The operation is now repeated the blank strip being moved inwardly again to the position shown in Fig. 1. The two parts thus formed are each slightly less than half circle and may be applied to any shaft or stem, to any member or group if no member, wedged over to taper out of the surface thereof to offer a locking means for abutment or bearing member or the like. To this end as stated the strip is originally thicker one side than the other and on the inner surface are formed a rib or ribs as indicated in Figs. 9, 10, and 12.

According to the present wide practice in automobile and valve stem design one or two such ribs fit into grooves 40 of a valve stem 41 having the usual valved head 42 fitted to a valve seat 43 of an engine cylinder block 45 and collar 46 provided with a taper corresponding with the outer taper of the split collar parts C having first been placed over the valve stem compressing the valve spring 48, is allowed to move over and embrace collar C under the influence of the usual valve spring. The usual actuating bar or valve is indicated at 49.

In view of the very wide use of this construction in uniformity and accuracy required of such collars rapid and economical production of such collar parts as constitute a problem affording many difficulties. The simplest and most economical as well as effective method has been accomplished by our present invention, a strip having one or more ribs first rolled into the blank strips having a proper predetermined taper as described. The strips are then fed through the guide opening into the recess 5 then cut off and bent around the forming head 7. Experiences demonstrate that as the forming tool 10 with its recess 12 is withdrawn the overhang and fairly tight grip of the member C' will retain it in position until the coining and holding member 16 comes into engagement. This member 16 strikes something of a blow we believe giving somewhat of a set to the metal which is further straightened and released during the cutting operation so that when the finished half collar C is removed by the ejecting tool or stripper member 20, it has been given a set to its final finished curvature and does not therefore tend to expand or spring out of shape. Accuracy to limits of a thousandth or two-thousandth of an inch are required in these parts and our process has enabled rapid production within these uniform close limits of size. The tool holding member 1 is usually made of cast or other comparatively soft metal wherefore it is desirable to form a cutting edge by setting a plate 25 in the side of the recess 5 against which the cutting edge of the tool steel cutting and forming member 10 may act in severing the strip B. This member is preferably provided with an opening sufficient to allow passage of the tool cutter 15 above and below which it may be provided a screw for tools into the block 1. The forming tools 6 and 10, are preferably removable, being held under suitable clamping members the frame parts 26 and 27 respectively, with screws 28 and 29 serving to clamp them in position.

Having thus described our invention, what we claim is:

1. The method of forming split tapered collars comprising a forming and tapered bar or strip, cutting off the bar to a length slightly greater than a given segment of a circle, bending the bar between the convex and concave surfaces, removing the concave surface and supporting the blank onto the convex surface with such pressure to obtain absolute conformance with the contour of said member and cutting the ends of the blank thus formed by substantially radial inward movement of cutting edges against the convex forming die and with a degree of accuracy permitting a substantially complete semi-circular collar, thereafter stripping the forming piece from the convex member.

2. A method of making split forming collars comprising cutting off from a preformed bar a length corresponding to somewhat more than half of a given circle and bending the cutoff portion around the convex forming member with a concave complementary member withdrawing the latter supporting the blank against the convex forming member with such pressure to obtain a relatively complete conformance of the blank with said member and moving the cutting edges inwardly radially to sever the ends of the blank while on the convex forming member with a degree of accuracy permitting a substantially complete semi-circular collar and arranging two of such half formed pieces in pairs to complete the split collar.

3. A method of forming segmental portions of split collars having tapered cross section and an inwardly projecting rib comprising rolling the bar into the section uniform, longitudinally thicker on one edge than the other and provided with an upstanding rib and feeding the rib to a cutting and forming tool and severing it to the proper length and by continued movement of the cutting tool, bringing the concave surface into complementary position with the convex surface to bend the severed portion into a segment of circle removing said concave surface supporting said portion with an amount of pressure to obtain relatively absolute conformance of said portion with the contour of the convex surface, and while thus supporting then cutting the overlapping edges along substantially radial lines so that the remaining portion forms a predetermined segmental portion of a circle and stripping the piece from the convex forming member.

4. A method of forming predetermined segmental circular portions of split tapered collars for valve stem or the like comprising pre-formed rolled bar stock at one edge thicker than the other and having a rib rising from one side thereof consisting of feeding the stock endwise against the stock to predetermined length while so held, cutting off the end portion, bending it around a substantially semi-cylindrical member with a tapered semi-circular surface complementary to the outer side of the bar stock, withdrawing the latter member and impinging and holding the tool against the convex surface of the formed portion and holding it while trimming the ends along substantially radial lines, forming a predetermined semi-circular portion which coincides with a like portion to form a complete collar of such size to be within a limited predetermined tolerance.

JOHN H. VAN UUM.
STEVEN RONYAK.
JOHN HOFFMAN.